Sept. 28, 1971   J. M. FRANCIS   3,608,289
COTTON HARVESTER

Filed May 11, 1970  4 Sheets-Sheet 1

INVENTOR
JAMES M. FRANCIS

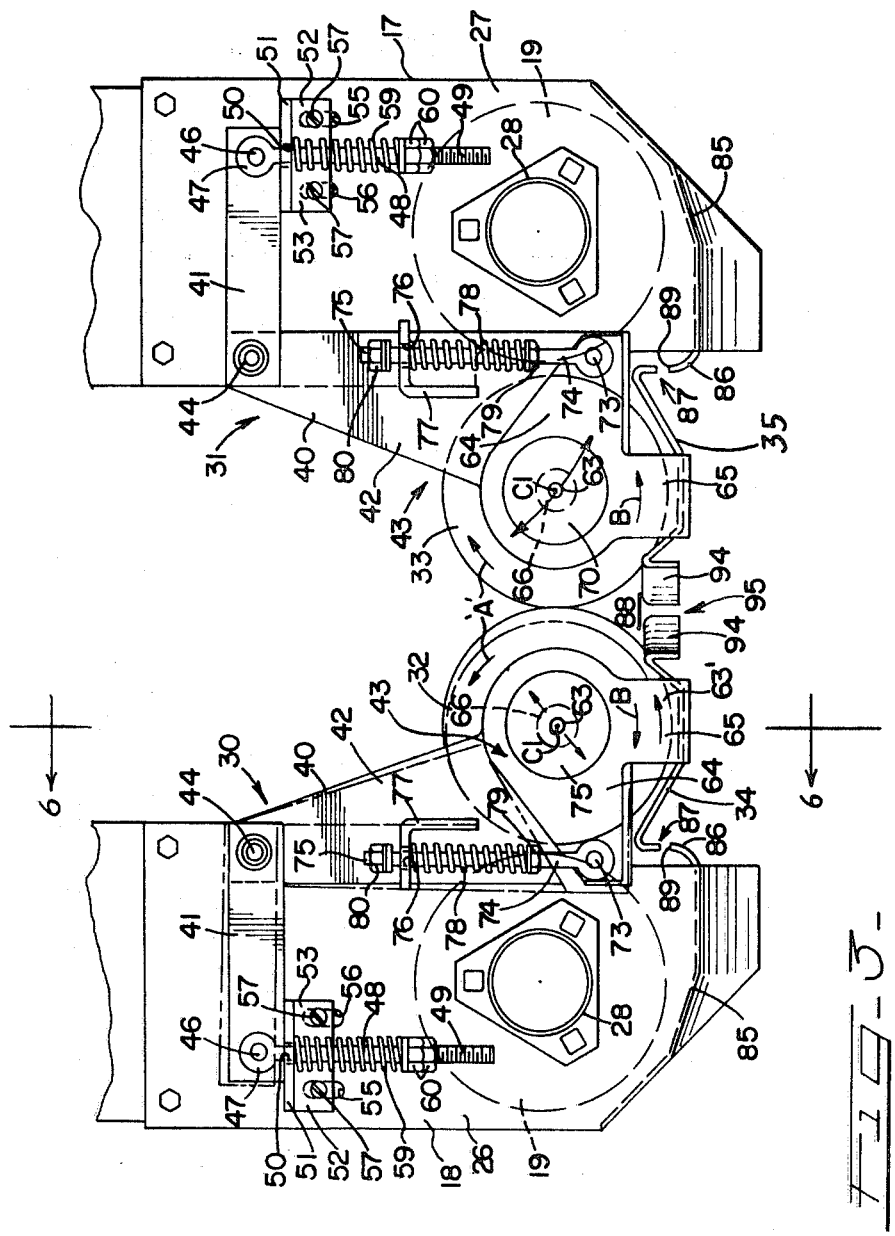

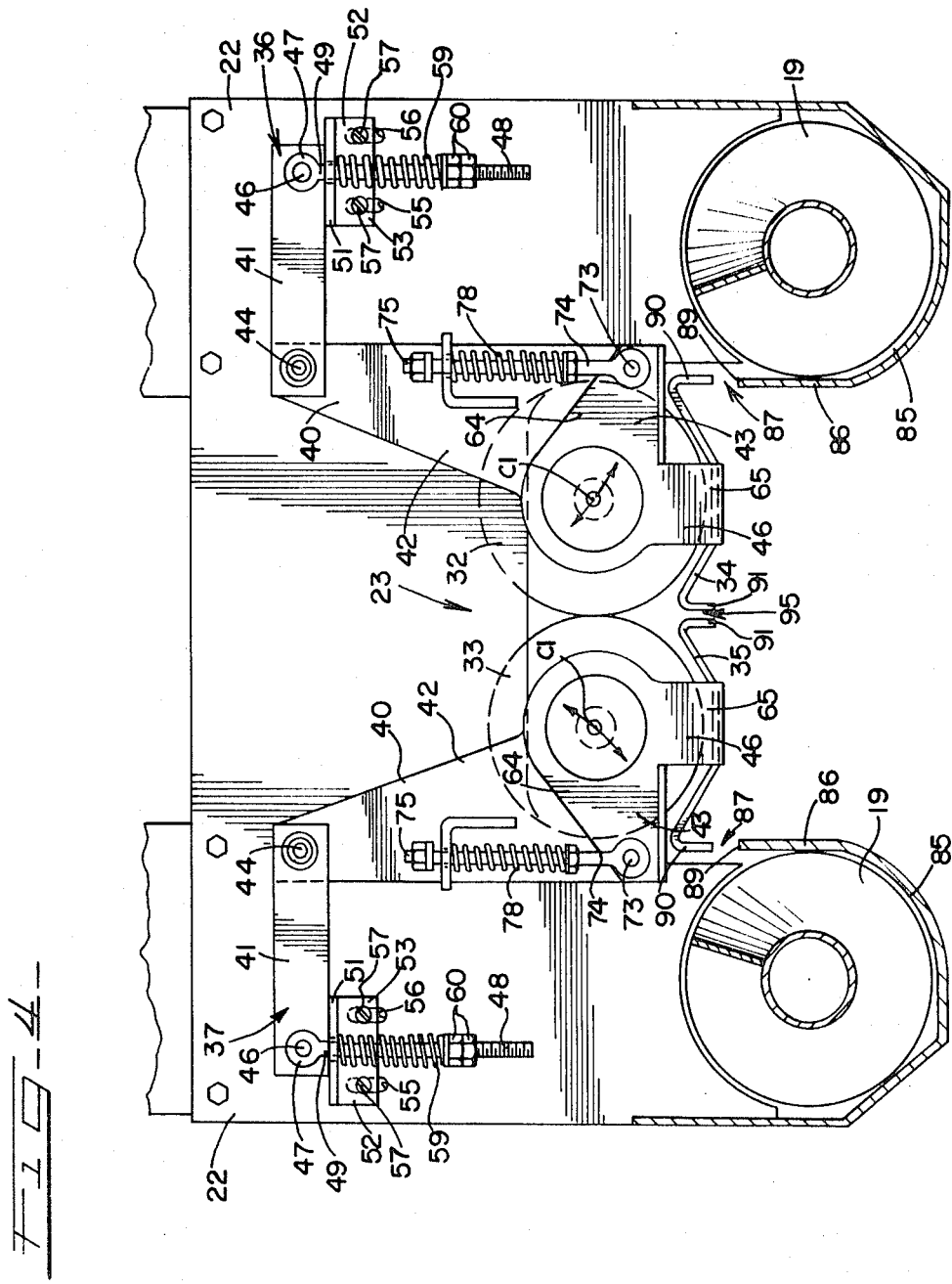

Sept. 28, 1971   J. M. FRANCIS   3,608,289
COTTON HARVESTER
Filed May 11, 1970   4 Sheets-Sheet 4
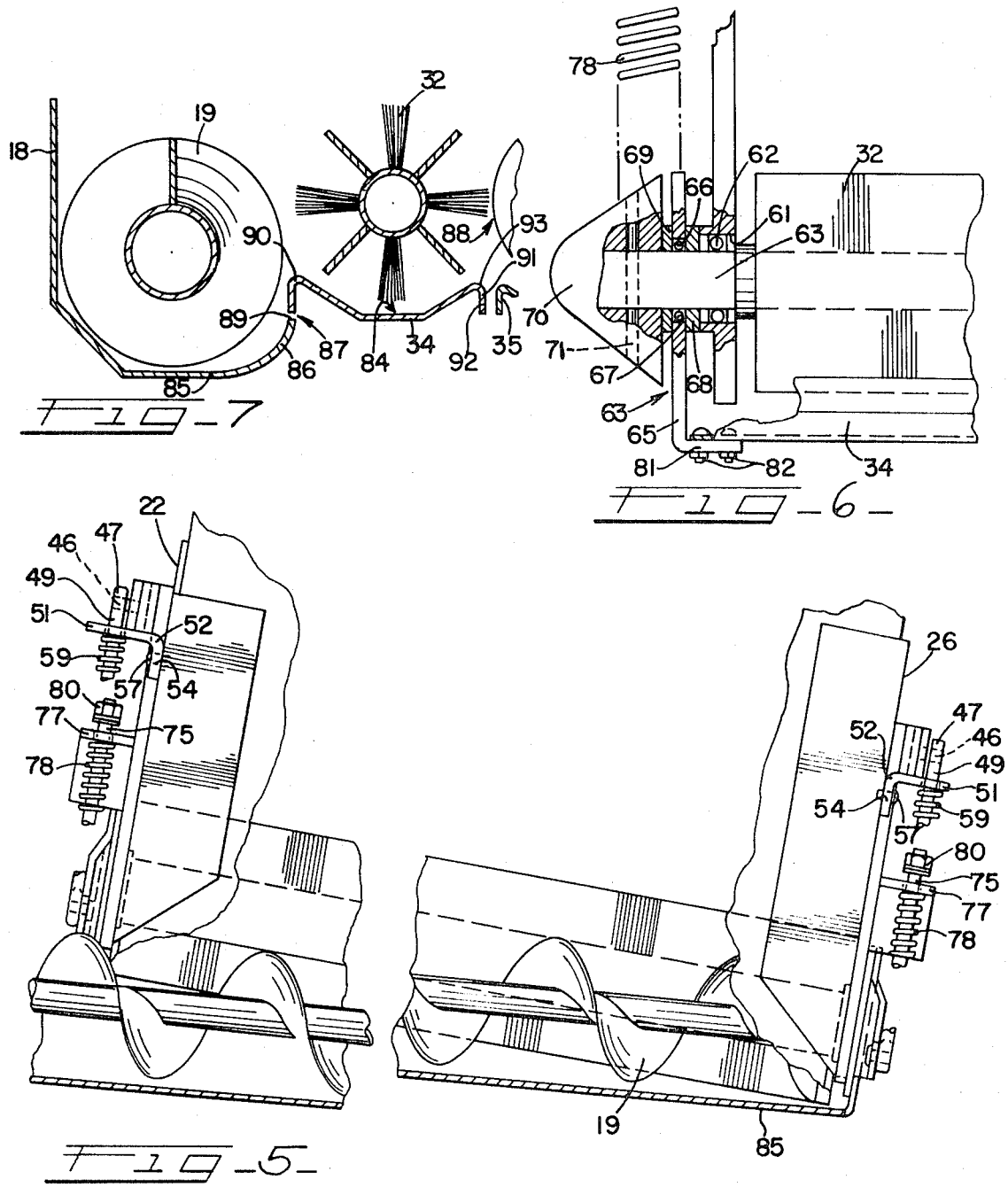
INVENTOR
JAMES M. FRANCIS

# United States Patent Office 3,608,289
Patented Sept. 28, 1971

3,608,289
COTTON HARVESTER
James M. Francis, Bettendorf, Iowa, assignor to
International Harvester Company, Chicago, Ill.
Filed May 11, 1970, Ser. No. 36,236
Int. Cl. A01d 45/20
U.S. Cl. 56—33                              10 Claims

ABSTRACT OF THE DISCLOSURE

A cotton harvester having a pair of plant stripper rollers, each having adjacent underposed stripper sheets coacting to provide cotton stripping action, each sheet having a surface for doffing and catching repeating cotton and mounted to move in conjunction with its respective stripper roller such that the sheet is yieldably movable relative to that roller to maintain a substantially constant clearance therewith.

BACKGROUND OF THE INVENTION

The instant invention is adaptable to be used on cotton harvesting machines, and more particularly to those machines that strip cotton from the standing cotton plants. Cotton harvesting machines of the stripper type generally employ at least one stripper roller which rotates and engages the plant in such a manner that the rotating action of the roller itself is operative to strip the cotton from the plant. Oftentimes pairs of rollers are employed and are operatively aligned and coact to produce the stripping action.

One of the problems encountered with using stripper rollers as hereinbefore mentioned is that a portion of the cotton tends to adhere to the roller and repeat, that is, cotton is not immediately flung from the roller but rather clings thereto for subsequent revolutions of the roller. Much of this repeating cotton would fall from the rollers onto the ground and is thereby lost unless some means is arranged below them to catch this cotton. Pairs of metal sheets commonly called stripper sheets have, from time to time, been mounted in underposed positions relative to the rollers to serve as an auxiliary plant stripping device and also provide a means for catching this repeating cotton. Such sheets are bolted in a fixed opposed position defining a fixed plant passage therebetween through which the plants must pass. It has been found that because of the fixed dimension of the plant passage that large plants or weeds can become wedged therebetween within the harvesting unit. In such instances the harvesting unit clogs resulting in down time while the unit is cleared of these plants and weeds by hand.

The instant invention has been directed toward correcting the above mentioned problems by mounting a stripper sheet such that it is independently yieldable with respect to its opposing stripper sheet and respective stripper roll in such a manner that it is mounted to pivot about the principal axis of that roll to thereby maintain a substantially constant spaced relationship thereto.

A general object of the invention is to provide a cotton harvester with a stripper sheet which will yieldably adjust to varying plant and weed sizes.

An object of the foregoing is to provide that the stripper sheet be used in conjunction with a stripper roller which is also yieldably mounted to adjust to varying plant sizes.

Another object of the invention is to provide that the stripper sheet be mounted relative to a stripper roller such that a constant doffing and cotton catching spaced relationship is maintained between the sheet and the roller when the sheet is moved.

Another object of the invention is to provide that a pair of opposed stripper rollers each have a stripper sheet yieldably mounted relative to a yieldably mounted stripper roller such that a plant passage is defined therebetween wherein the sheets coact to provide cotton plant stripping action.

A specific object of the foregoing is to provide that each stripper sheet be yieldably mounted such that a substantially constant spaced relation between the stripper roller and sheet is maintained regardless of displacements of either the roller or the sheet.

A more specific object of the foregoing is to provide that the stripper sheet move about an axis coincidental with the principal axis of the stripper roller.

BRIEF DESCRIPTION OF THE DRAWINGS

FIG. 3 is an enlarged front elevational end view;

FIG. 4 is an enlarged rear elevational end view;

FIG. 5 is a broken side view taken substantially at line 5—5 of FIG. 2;

FIG. 6 is a fragmentary elevational view with parts broken away taken substantially at line 6—6 of FIG. 3; and FIG. 7 is a sectional view taken substantially at line 7—7 of FIG. 2.

DESCRIPTION OF THE PREFERRED EMBODIMENT

Figure 1:
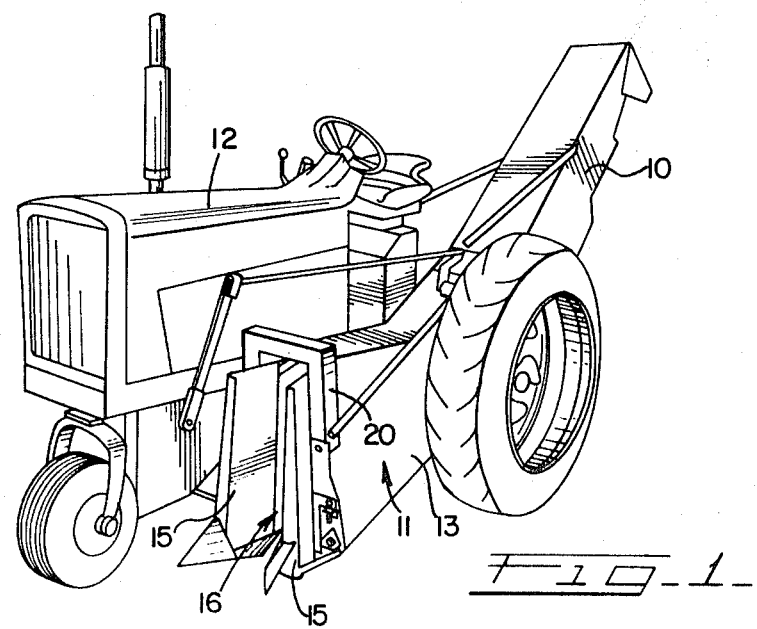
FIG. 1 is a perspective view of a tractor having a field going cotton harvester of the stripper type mounted thereon.

Referring to FIG. 1 there is shown a harvesting machine 10 having a stripper harvesting unit 11 mounted on a tractor 12. The stripper unit has a structural outer housing 13 with forwardly disposed plant lifting shoes and shields 15 symmetrically disposed at the front of said housing 13 to define a plant entrance 16 therebetween.

Figure 2:
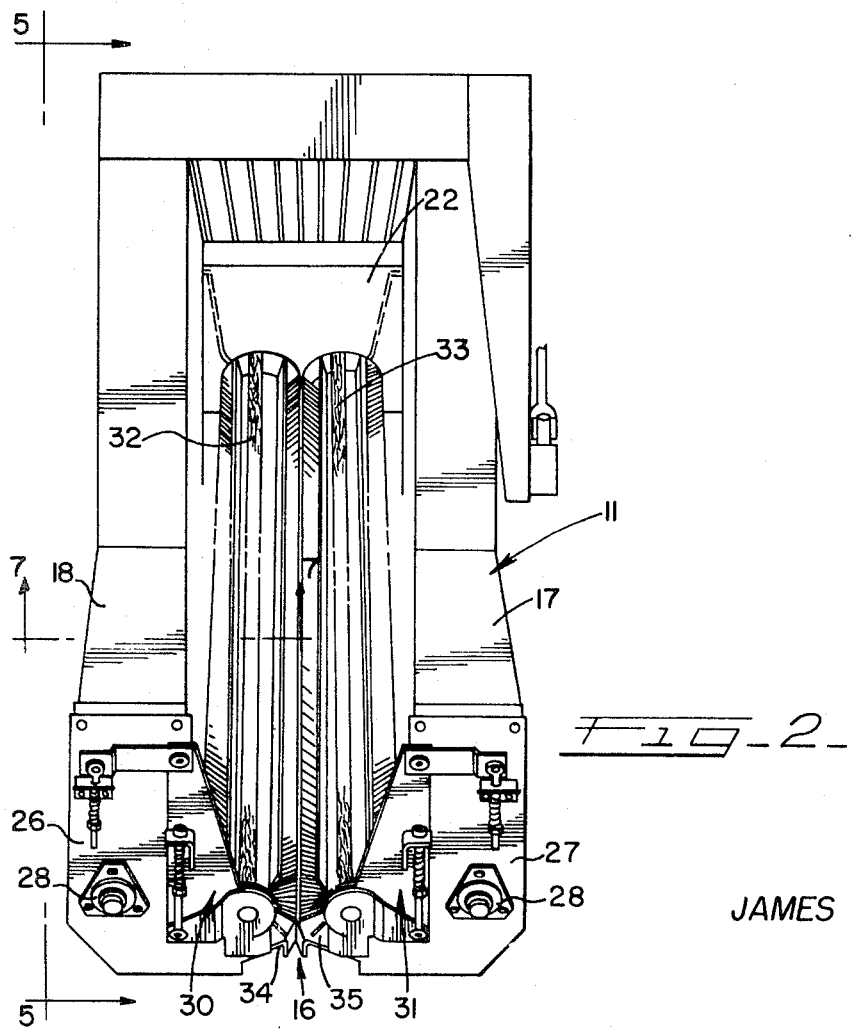
FIG. 2 is a front view of the harvesting unit with parts removed.

Referring in detail to FIGS. 2 and 3, it can be seen that the harvesting unit 11 has a pair of longitudinally spaced apart wall structures 17 and 18, respectively, each operative to incorporate therein an auger 19 which is carried in the wall structures 17 and 18 as shown in FIG. 3. These augers 19 are operative to carry the harvested lint cotton and other debris rearwardly to separating means not shown. The wall structures 17, 18 are held together at their forward portions by an inverted U-shaped member 20 (shown in FIG. 1), this member is effective for holding the walls at a properly spaced relation in the forward end of the harvesting unit. The rearward portions of the wall structures are connected and retained in spaced relation by a transversely oriented back wall 22.

Each of the wall structures 17 and 18 are formed to include a forwardly disposed transverse surface defining mounting plates 26 and 27, respectively. Mounted on each of these plates is a bearing holder 28 which rotatably supports at the end the augers 19 enclosed within the structural walls.

The subject matter of the instant invention, namely, a supporting mechanism generally designated 30 and 31 are mounted on the walls 17, 18 and more specifically on the forwardly disposed mounting plates 26 and 27, respectively. These mounting mechanisms (30, 31) are operative for mounting and carrying the forward ends of stripper rollers 32, 33 and underposed stripper sheets 34, 35 respectively. The stripper rollers shown are of the brush type but it should be noted that other types of rollers, such as cast rib metal rollers can be used without violating the inventive concept of the invention. Essentially identical supporting mechanisms 36 and 37 are mounted on the back wall 22. One of the supporting mechanisms designated 36 mounts the rearwardly disposed ends of stripper roller 32 and stripper sheet 34 and the other mechanism 37 carries the rearward ends of stripper roller 33 and stripper sheet 35 as shown in FIG. 4.

It should be noted, at this time, that the forward supporting mechanisms 30, 31 and each of the rearward supporting mechanisms 36, 37 mounted on the rear wall 22 supporting the rearward ends of stripper rollers 32, 33 and stripper sheets 34, 35 are essentially identical in structural makeup, and mounting on their respective wall structures except for the reversal of parts. Therefore, only the supporting mechanism 30 will be described and reference numerals applied thereto will be similarly applied to corresponding structure in the other supporting mechanisms, and it is to be understood that the functional relationships hereinafter described for the supporting mechanism 30 will also apply to the other supporting mechanisms on the front and rear walls.

As best seen in FIG. 3, the mechanism 30 comprises bellcrank 40 having arms 41, 42. The arm 42 supports the stripper sheet (34) bellcrank arrangement generally designated 43. A pintle 44 is mounted on the front plate 26 and serves to carry the bellcrank 40 which is rotatably supported and retained thereon at a location common to both the legs 41, 42. A pin 46 has been secured to one end of the arm and extends outwardly therefrom at a position in spaced relation to the pintle 44. The pin 46 receives and retains an eye portion 47 of an eyebolt 49. A threaded shank 48 of the eyebolt 49 passes through a hole 50 located in an outwardly extending flange 51 of a reactive bracket 52. The bracket 52 has a downwardly extending flange 53 having a pair of spaced apart holes 54 (see FIG. 5) aligning with slots 55, 56, arranged in the plate 26. Both the holes 54 and the slots 55, 56 receive therethrough bolts 57 which are operative to adjustably secure bracket 52 to the front wall 26 in a plurality of elevational positions relative to the location of the pintle 44.

A coil spring 59 is disposed over the threaded shank portion 48 of the eyebolt 49 and is secured in place by nuts 60 threaded onto the shank portion to adjustably compress the spring 59. It can be appreciated that as the spring is compressed by turning the nuts 60 on the shank portion, one end of the spring bears against the lower surface of flange 51 providing a downward force which is exerted on the eyebolt 49 to thereby bias the arm 41 of the bellcrank 40 downwardly such that the end portion of the arm 41 rests upon the top surface of the outwardly extending flange 51.

The other arm 42 of the bellcrank 40 has a hole 61 in which has been inserted a bearing 62 which rotatably supports a centrally disposed stub shaft 63 of the stripper roller for rotatably carrying the stripper roller at the end on the arm 42 (see FIG. 6).

The supporting mechanism also includes a stripper sheet carrier designated 43 comprising arms 64 and 65. A hole 66 has been centrally located at that portion of the carrier 43 that is common to both of the arms 64 and 65. The hole 66 carries a bearing 67 which mounts on the stub shaft 63 of the stripper roller. As best seen in FIG. 6, the stripper sheet carrier mounts forwardly of the arm 42 of the bellcrank 40 on the stub shaft 63 and is held in spaced relation thereto by a collar 68 slid over the shaft 63. A washer 69 and a front cone 70 secured to the shaft by a pin 71 serve to secure the bellcrank 40 and the stripping sheet carrier 43 in position on the stub shaft 63 in such a manner that the arm 42 rotatably carries the stripper roller by means of the stub shaft 63 which in turn rotatably carries stripper sheet carrier 43. An outwardly extending pin 73 is securely fixed to the distal end portion of the arm 64. The pin 73 receives and retains eyebolt 74 which has a threaded shank portion 75 disposed to extend upwardly through a hole 76 in a bracket 77 which has been securely fastened to and extends outwardly from the bellcrank arm 42 of the bellcrank 40. A coil spring 78 is retained at one end of the shank portion 75 by a nut 79. Upwardly from the nut 79 at the other end of the threaded shank portion 75 has been placed a nut 80 at a position above the bracket 77. It can be seen that as the nut 80 is threaded upon the shank portion of the eyebolt, the eyebolt and the arm 64 will be drawn upwardly while at the same time the spring 78 is compressed and loaded.

The other arm 65 of the stripper carrier 43 has a flange 81 angled to lie substantially parallel with the principal axis of the stripper roller. This flange 81 provides a surface for fastening one end of the stripper sheet 34 thereto by such means as nut and bolt assemblies 82.

It can be seen in FIG. 3 that both wall structures 17 and 18 define a bottom trough 85 underposed relative to the auger 19. Each trough 85 has an upwardly extending lip portion 86 which terminates adjacent its respective stripper roller to thereby define a space or gap designated 87 therebetween. It should be pointed out at this time that stripper rollers 32 and 33 angle upwardly relative to the horizontal with each having their principal axis disposed in substantial parallelism.

The stripper rollers flank each side of the plant passage and form a bight portion 88 which lies symmetrically within the plant passage and runs coextensive therewith.

The augers 19 also angle upwardly but at a lesser angle than the stripper rollers to produce the effect of the auger receding from the stripper roller as they both extend rearwardly. It can be seen in the sectional view of FIG. 7 that the lip 86 is shown to have a longer upward extension. This increasing length of the lip 86 is necessary to assure that the gap 87 between the edge of the lip 86 and the associated stripper roller remains substantially constant along the effective length of the stripper roller. It is apparent from the foregoing that the edge 86 increases in vertical extent as the trough 85 extends rearwardly under the auger 19; it is also obvious that the edge 89 of the lip 86 maintains a substantially parallel disposition relative to the principal axis of the associated stripper roller.

The stripper sheets 34 and 35 have an essentially identical makeup therefore only one will be described in detail here. Stripper sheet 34 comprises an elongated and continuous piece of metal sheet extending between and fastened to each end to the flange 81 of the downwardly extending arm 65 of the front and rear disposed stripper sheet carriers 43. As best seen in FIG. 7 the stripper sheet has a cross sectional profile defining an upwardly facing concave surface 84 which conforms substantially to the superposed stripper roller. At each longitudinal edge of the stripper sheet are formed rolled or bent edges, designated 90, 91 respectively, wherein the edge 90 lies adjacent the auger 19 and edge 91 is spaced inwardly therefrom adjacent the bight portion 88. It should be noted that the edge 90 lies to define the space 87 in such a manner that cotton falling thereat is prevented from dropping through the space 87 onto the ground. The edge 90 also has been disposed in close proximity to the peripheral surface of the stripper roller thereby to provide cotton doffing action therewith. The edge 91 provides a vertical surface 92 and an apex 93 which promotes stripping action as the opposing stripper sheets coact on the standing plants. It should be noted that the spaced relation between the peripheral surface of the stripper roller and the concave surface and edges 90, 91 of the stripper sheet is substantially constant in parallel arrangement along their entire effective length, it is also apparent that each stripper sheet must therefore angle upwardly essentially the same angle as the stripper roller to attain this parallelism. The forward portions of each stripper sheet have a beveled edge 94 which when the sheets are mounted angle forwardly and outwardly from the edge 91 to define a pair of diverging vertical surfaces disposed at a transverse angle relative to the principal axis of the stripper rollers 32, 33 and plant passage 23. It can be seen in FIGS. 2 and 3 that the beveled edges 94 of the stripper sheets 34 and 35 together form a V-shaped plant receiving guide effective to guide the plants to an adjusted gap 95 between opposed edges 91 and vertical surfaces 92 of the stripper sheets 34 and 35.

In operation the stripper rollers 32 and 33 are driven by a gear train (not shown) to rotate in an opposing upwardly direction as indicated by the arrows A. The operator can adjust the positions of the stripper rollers relative to each other by loosening the bolt 57 and sliding the bracket 52 upwardly or downwardly as desired, this causes the bellcrank 40 and its arm 42 to pivot about the pintle 44 to thereby provide an arcuate movement operative to displace the stripper roller in directions as indicated by the arrow passing through the principal axis (designated C1 in FIGS. 3 and 4) of each stripper roller. As the plants pass between the stripper rollers 32, 33 at the bight portion 88 the rollers will be able to yield if necessary and move away from each other toward their respective augers 19 against the biasing effect of their particular mountings i.e., the spring 59 acting on the arm 41 of the bellcrank 40.

Since the stripper sheet carrier 43 is also mounted for rotational movement about principal axis C1 of the stripper roller, it is constrained to move in its entirety with its associated stripper roller in a same direction as indicated by the arrows passing through C1. However, because the stripper carrier 43 can also rotate about principal axis C1, it can move in a direction as indicated by arrow B (FIG. 3). The biasing effect of spring 78 on carrier 43 allows the stripper sheet to yieldably move when an obstruction or plants pass into the gap 95, when these plants or obstructions are larger than that gap. The yieldable biasing force of the spring 78 on each sheet acts to urge the sheets together against those plants therebetween causing the sheets 34, 35 to coact and effect a riding upward and a stripping action on the plants at the edge 93 thereof due to the rearward incline of the stripper sheets. It can also be appreciated that as each stripper sheet rotates in the direction B away from one another, the gap 87 between the rib 86 and the stripper roller is continually covered and the relative distance of the edge 90 to the periphery of the stripper roller is maintained at a substantially constant spaced relation to assure doffing action thereat.

From the foregoing it can be appreciated that the instant invention provides a novel mounting for stripper rollers and their associated underposed stripper sheets. It can be seen that the stripper rollers are yieldably displaceable relative to each other such that they can conform to varying field conditions. The stripper sheets are also yieldably mounted to rotate about the principal axis of their associated stripper roller in an individual relation with respect to each other on the stripper rollers and are thereby able to be yieldably displaced to independently adapt to field conditions.

It should be noted that the inventive concept herein disclosed is not dependent upon a pair of stripper rollers and their associated stripper sheets disposed in coacting relationship to each other. It is contemplated that one of the stripper rollers and its underposed stripper sheet could be replaced from a static element or abutment means against which the remaining stripper roller and stripper sheet could coact along their effective lengths to perform plant stripping operations.

It will be appreciated that the embodiment of the invention chosen is for the purpose of illustration and description, and is preferred based upon requirements for achieving the objects of the invention and developing the utility thereof in a most desirable manner, due regard being given to existing factors of economy and simplicity. It will be understood that the particular structure and the functional aspects emphasized herein are not intended to exclude but rather to suggest other such modifications and adaptations as fall within the spirit and scope of the invention as hereinbefore described.

What is claimed is:

1. A harvesting unit of the stripper type having longitudinal and laterally spaced apart wall structures defining a plant passage therebetween; a pair of rotatably driven stripper rollers disposed in substantial parallelism between said wall structures in a plant tripping coactive relation to each other, and said rollers having their principal axes extending longitudinally along said plant passage to form a plant stripping bight portion coextensively disposed therealong; a stripper sheet disposed beneath each of said stripper rollers with each said sheet in operative plant stripping alignment with each other, means mounting said stripper rollers on said wall structures to provide pivotal movement for each roller transversely of said plant passage; first means yieldably biasing each of said rollers toward the plant passage to form the bight portion thereat, means mounting each of said stripper sheets in spaced relation to their respective stripper rollers and enabling arcuate movement of each said sheet about a portion of their respective stripper roller; and second biasing means yieldably urging each of said stripper sheets toward said plant passage and each other to promote a stripping engagement of each stripper sheet with plant passing therebetween.

2. The invention as recited in claim 1 and said wall structures each having a cotton receiving trough disposed laterally adjacent each said stripper roller to receive picked cotton therefrom, conveying means in each said trough effective to convey the picked cotton from the harvesting unit, each said stripping sheet having a cotton doffing surface disposed proximate said roller associated therewith and adjacent said trough and being operative to doff clinging cotton from said associated stripper roller.

3. The invention as recited in claim 1 wherein said means mounting each of said stripper rollers comprising: a pair of bellcranks each having a pair of arms; a pair of pintles spaced apart fore and aft with each of them extending from said adjacent wall structure pivotally carrying one of said bellcranks thereon; one arm of each said bellcrank rotatably supporting said stripper roller at spaced apart positions; the other arm of each bellcrank operatively connected to said first biasing means which operates thereon to effect a biasing of said stripper roller toward said plant passage.

4. The invention as recited in claim 3 wherein said means mounting each of said stripper sheets comprising: a pair of stripper sheet bellcranks rotatably mounted on said associated stripper roller for pivotal movement about the principal axis thereof, each stripper sheet bellcrank disposed adjacent one of said stripper roller bellcranks supporting that associated roller and each of said stripper sheet bellcranks having a downwardly depending arm aligned with one another carrying said stripper sheet in spaced relation to the associated roller, and another arm connected to said second biasing means which is operative thereon to bias said stripper sheet toward said plant passage.

5. The invention as recited in claim 4 wherein said first biasing means comprising: a pair of spring elements each operably connected between the other arm of said stripper roller bellcranks supporting said roller and the adjacent wall structure; and said second biasing means comprising a pair of spring elements each operatively connected between said stripper roller bellcranks supporting the roller and said other arm of the adjacently disposed stripper sheet bellcrank.

6. The invention as recited in claim 5 wherein each stripper sheet having a cotton stripping edge disposed coextensive with said plant passage and adjacent one another forming a plant receiving gap therebetween, and each said stripper sheet having a cotton doffing edge spaced apart from said cotton stripping edge and disposed proximate said associated stripper roller to effect a cotton doffing action therewith.

7. In a cotton harvesting unit of the stripper type having longitudinal and laterally spaced apart wall structures defining a plant therebetween, a rotatably driven stripper roller mounted from one of said wall structures with the principal axis thereof extending longitudinally therewith and adjacent said plant passage, a stripper sheet underposed relative to said stripper roller, abutment means mounted from said each of said wall structures and disposed to coact with said stripper roller and sheet to effect a cotton stripping action therewith, the improvement incuding means mounting said stripper roller and sheet comprising: bracket means movably mounting said stripper roller on said one wall to provide movement of said stripper roller in directions towards and from said plant passage, biasing means yieldably urging said bracket means toward said plant passage and said abutment means, stripper sheet mounting means rotatably mounting said stripper sheet in a generally underposed spaced relation to said stripper roller and operative to provide arcuate movement of said stripper sheet about a portion of said stripper roller, stripper sheet biasing means opeatively connected to said stripper sheet mounting means to effect a biasing of said stripper sheet toward said abutment means thereby providing a yieldable stripping action therewith.

8. The invention as recited in claim 7 wherein said bracket means comprising: a pair of spaced apart bellcranks pivotally mounted on said one wall; each bellcrank comprising, a first arm rotatably supporting said stripper roller at opposite ends thereof, a second arm connected to said bracket biasing means and operative to bias said stripper roller towards said abutment means through pivotal action of said bellcranks.

9. The invention as recited in claim 8 wherein said stripper sheet mounting means comprising: a pair of elements each rotatably mounted on said stripper roller adjacent one of said bellcranks, and each said element having a first arm supporting said stripper sheet in said underposed relation, and a second arm connected to said stripper sheet biasing means which operates thereon to effect a biasing of said stripper sheet towards said abutment means.

10. The invention as recited in claim 9 wherein said stripper sheet comprising: a concave surface facing said stripper roller, a cotton stripping edge disposed longitudinally along said surface adjacent said abutment means, a cotton doffing edge arranged along the surface in spaced relation from said stripping edge and disposed in close proximity to said roller, said doffing edge operative to doff clinging cotton from said roller; and means for receiving the doffed cotton from said stripper sheet disposed in an underposed relation thereto.

References Cited
UNITED STATES PATENTS

| | | | |
|---|---|---|---|
| 1,769,104 | 7/1930 | Benjamin | 56—33 |
| 2,491,777 | 12/1949 | Smith | 56—33 |
| 2,655,780 | 10/1953 | Dugan | 56—33 |
| 2,834,175 | 5/1958 | Knowles | 56—33 |
| 3,014,331 | 12/1961 | Mason, Jr. | 56—33 |

LOUIS G. MANCENE, Primary Examiner

J. A. OLIFF, Assistant Examiner